United States Patent [19]

Gander et al.

[11] Patent Number: 4,756,148
[45] Date of Patent: Jul. 12, 1988

[54] LINE CUTTER WITH EDGING ATTACHMENT

[75] Inventors: John F. Gander; Otto D. Dunnebacke, both of Cape Town, South Africa; Michael A. Helmig, Springtown, Tex.

[73] Assignee: Nylon Line Cutters (Pty.) Ltd., Cape Town, South Africa

[21] Appl. No.: 892,808

[22] Filed: Aug. 1, 1986

[51] Int. Cl.$^4$ .................... A01D 34/84; A01G 3/06
[52] U.S. Cl. ...................... 56/17.2; 56/12.7; 56/256; 172/17
[58] Field of Search ............ 56/256, 12.7, 16.9, 56/17.2; 172/17

[56] References Cited

U.S. PATENT DOCUMENTS

| | | | |
|---|---|---|---|
| 2,938,323 | 5/1960 | Livingston et al. | 56/17.2 |
| 3,090,186 | 5/1963 | Dykes et al. | 56/256 |
| 3,221,481 | 12/1965 | Mattson et al. | 56/16.9 |
| 4,068,376 | 1/1978 | Briar | 56/12.7 |
| 4,224,784 | 9/1980 | Hansen et al. | 56/16.9 |
| 4,364,435 | 12/1982 | Tuggle et al. | 56/17.2 |

FOREIGN PATENT DOCUMENTS 1260223  2/1968  Fed. Rep. of Germany ........ 172/17

*Primary Examiner*—Paul J. Hirsch
*Assistant Examiner*—Vincent Ciamacco
*Attorney, Agent, or Firm*—James E. Bradley

[57] ABSTRACT

A flexible nonmetallic line trimmer for cutting vegetation has a wheel support for edging operations. The trimmer has a safety guard that extends around the rearward portion of a motor housing. A sliding bracket is mounted to the safety guard. A wheel is mounted on the forward end of the sliding bracket. The bracket will slide between a retracted position with the wheel to one side of the housing to an extended position with the wheel in front of the housing to support the cutter.

11 Claims, 2 Drawing Sheets

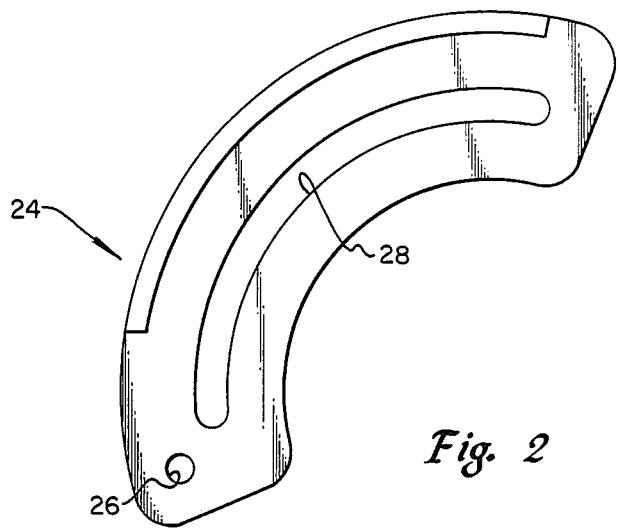
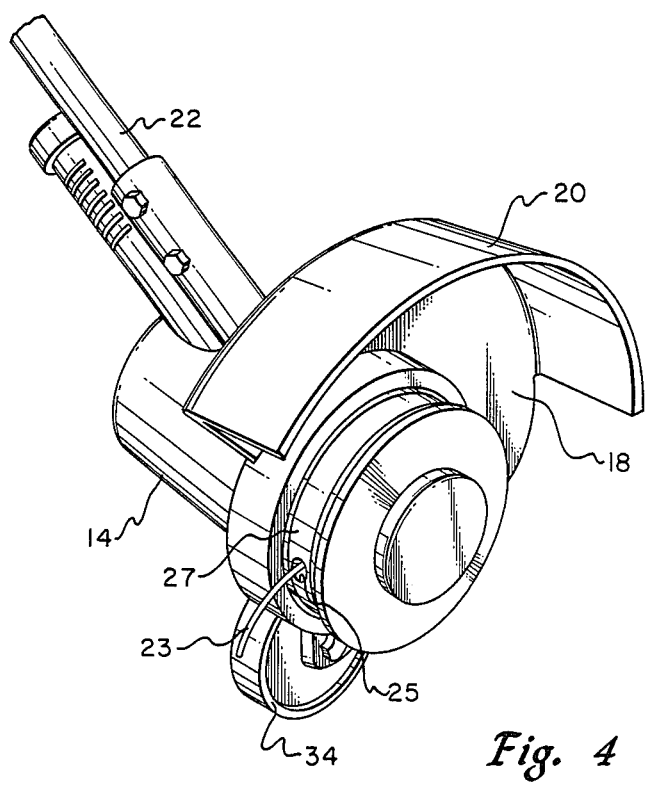

LINE CUTTER WITH EDGING ATTACHMENT

BACKGROUND OF THE INVENTION

1. Field of the Invention

This invention relates in general to cutting of vegetation using a flexible, nonmetallic cutting line extending from a rotating head, and in particular to such an apparatus having an attachment for use as an edger.

2. Description of the Prior Art

A flexible line trimmer has a rotating head that is driven by an electrical or gasoline motor. The head includes a housing which has an aperture at its periphery. A spool is located in housing containing a supply of coiled monofilament, nonmetallic line. The line extends out the aperture into a cutting plane for trimming the vegetation.

Line trimmers of this type are most frequently used for trimming grass around trees, fences and buildings. Normally, the trimmer is held upright, with the line generally horizontal.

Line trimmers of this type can also be used to edge. When edging, the line trimmer head is rotated 90 degrees, so that the line is vertical. The line extends between the grass and the edge of a sidewalk, curb or driveway when used in this position.

It is somewhat cumbersome to use the device as an edger because the device is normally constructed to be used with the line in basically a horizontal plane. It is hard to maintain the head the same distance above the ground and in a straight line while the line is oriented vertically.

Conventional edgers using a rigid blade have a wheel that supports the edger above the ground at a fixed distance. There have been proposals to use a wheel in conjunction with a line trimmer to support the trimmer in a position with its line vertical for edging. These proposals have various deficiencies.

SUMMARY OF THE INVENTION

According to the present invention there is provided a line cutter which includes an edging attachment, the edging attachment comprising an element having an operative position in which it supports the cutter while the cutter is held with the motor axis horizontal for edge trimming use, the element being displaceable between said operative position and a retracted inoperative position.

In one form the element can be moved along a plate on which it is mounted, the element preferably being displaceable, in increments along the plate. In another form the cutter's casing comprises a safety guard, there being a slide mounted on the safety guard and the supporting element being mounted on the slide.

The supporting element could, for example, be a downwardly convex arcuate strip which acts as a skid. It is preferred, however, that it be a wheel, or a pair of wheels, or a group of wheels.

BRIEF DESCRIPTION OF THE DRAWINGS

FIG. 2 is a plan view of the slide used with the cutter of FIG. 1;

FIG. 4 is a pictorial view illustrating the line cutter of FIG. 1 in its edge trimming orientation.

DESCRIPTION OF THE PREFERRED EMBODIMENT

Figure 1:
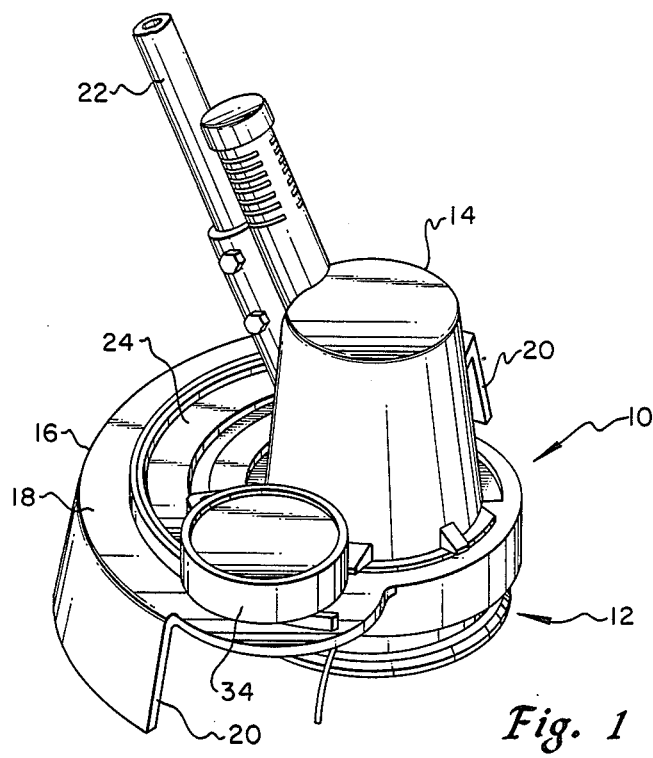
FIG. 1 is a pictorial view of a line cutter incorporating an edging attachment according to the present invention.

The line cutter illustrated in FIG. 1 is designated 10 and comprises a housing or casing generally designated 12. The casing 12 itself consists of a motor housing 14 and a safety guard 16 extending around the rearward portion of the casing 12. The safety guard 16 is in the form of a flat, horizontal plate 18 with a depending flange 20 extending downwardly from the outer periphery thereof. Flange 20 extends for about 120 degrees. A handle 22 extends rigidly upwardly at an acute angle from the casing 12. As shown in FIG. 4, a flexible, monofilament, nonmetallic line 23, preferably Nylon, extends outwardly from an aperture 25 in a head or spool housing 27. The line 23 is coiled on a spool (not shown) in head 27. A line feeding mechanism (not shown) in spool housing 27 feeds out additional increments of line as it wears. Head 27 rotates about a motor axis that is perpendicular to the cutting plane formed by line 23.

A bracket or slide 24 (see FIG. 2) is mounted on top of the plate 18. The slide 24 is of generally arcuate form and has an aperture in it at 26 and an arcuate slot 28. The slot 28 and the radius of slide 24 are generally concentric with the axis of the motor housing 14.

Figure 3:
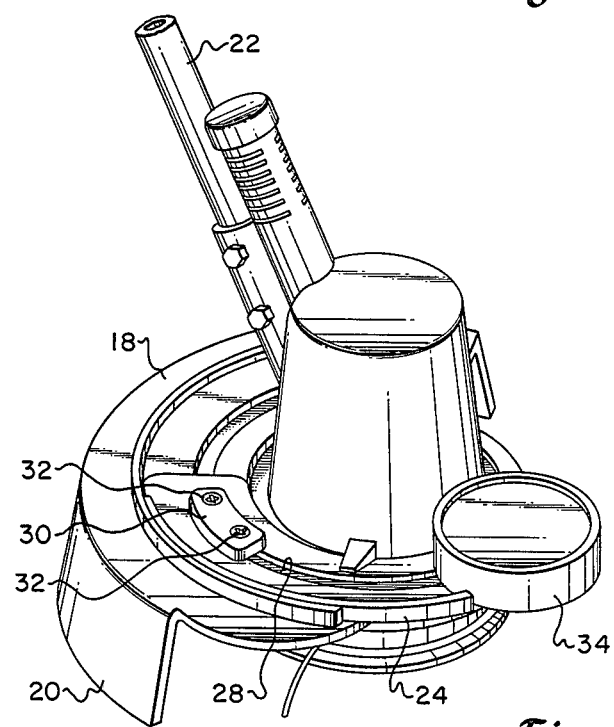
FIG. 3 is a further pictorial view of the line cutter of FIG. 1 with the edging attachment in a different position.

The slide 24 is mounted on the plate 18 for sliding movement of about 90 degrees around the motor axis between the retracted position as shown in FIG. 1 and the operative position shown in FIG. 3. The slide 24 can be mounted on the plate 18 in any suitable manner. For example, in the illustrated form, a retaining bracket 30 is mounted on the top surface of the plate 18. The screws 32 which mount the bracket 30 in place pass through the slot 28, and the bracket 30 overlies the top face of the slide 24 to prevent it being detached from the plate 18. The plate 18 and slide 24 can be provided with cooperating dimples and recesses which serve to locate the slide 24 in its position of adjustment. By slightly flexing the slide 24, the dimple can be disengaged from the recess in which it was seated, the slide 24 displaced (such displacement being guided by the screws 32), and the dimple reseated in another recess.

A rotatable wheel 34 has a shaft (not shown) which is mounted in the aperture 26. The wheel 34 has an axis parallel with the motor axis. The wheel 34 protrudes past the forward edge of the slide 24.

The edging attachment constituted by the slide 24 and wheel 34 are shown in its inoperative position in FIG. 1. More specifically, the wheel 34 is retracted so that it fully overlies the plate 18 and is located to one side of casing 12. In FIG. 3, the slide 24 is shown in its other end position in which it protrudes forwardly beyond the plate 18. It will be noted that it is the part of the slide 24 which has the wheel 34 mounted thereon which protrudes and is on the opposite side of casing 12 from handle 22. The handle 22 lies in a plane containing the axis of wheel 34 and the motor axis when the slide 24 is in the fully extended position.

In operation, when the cutter is used for cutting the surface of a lawn, it is orientated as shown in FIG. 1 so that the axis of rotation of the motor is vertical, and the line 23 rotated in a cutting plane that is generally horizontal. The wheel 34 is preferably in the retracted inoperative position during horizontal trimming.

When it is used for trimming edges, handle 22 is rotated 90 degrees so that the cutter 10 is held in the position shown in FIG. 4, with the axis of rotation of the motor horizontal and the cutting plane of line 23 in a substantially vertical position. The slide 24 will be first moved to the extended operative position, and locked with the dimples in a desired position. It will be noted that in this position the wheel 34 is lowermost. It therefore supports the line cutter as it is moved along to trim the edge of the lawn. Normally wheel 34 will roll along the edge of a sidewalk, curb or driveway, providing support for the cutter and keeping it a uniform distance from the ground.

Because the wheel 34 moves on an arc when the slide 24 is displaced, the height of the axis of the motor housing 14 above ground level is varied by displacing the slide. In the position illustrated in FIG. 3, the motor housing axis is at its most elevated because the wheel 34 is vertically below the motor housing 14. By displacing the wheel 34 to the left in FIG. 3, the motor housing 14 is effectively lowered.

If desired, the aperture 26 can be replaced by a series of apertures (not shown) connected together by a slot which is narrower than the diameter of any aperture. The wheel 34 can, in this form, be spring biased and its mounting can include a portion which has the same diameter as the series of apertures and another portion which has the same diameter as the connecting slot. Normally, it is the larger diameter part of the wheel mounting which is located in one of the apertures. By lifting or depressing the wheel, the smaller diameter part of its mounting is brought into cooperating relationship with the slot, and the wheel can then be displaced along the slot until it is aligned with another aperture. When the wheel is released, the larger diameter part of its mounting moves into that aperture thereby to relocate the wheel. By this means incremental adjustment of the position of the wheel 34 with respect to the motor housing 14 is possible.

The invention has significant advantages. The slide facilitates the use of the trimmer as an edger by providing support on the ground. The wheel attachment is light in weight so as to not make the unit unduly heavy for use in its horizontal position. The wheel can be moved to an inoperative position so that it will not interfere with conventional horizontal trimming.

While the invention has been shown in only one of its forms, it should be apparent to those skilled in the art that it is not so limited, but is susceptible to various changes without departing from the scope of the invention.

We claim:

1. In a line trimmer for cutting vegetation of the type having a housing, a head mounted to the housing for rotation about an axis, a flexible nonmetallic line extending outwardly from the head in a cutting plane generally perpendicular to the axis, and a safety guard mounted to the housing extending around a rearward portion of the cutting plane, the improvement comprising:
    a single wheel having an axis of rotation and adapted to be placed in contact with the ground; and
    mounting means for mounting the wheel to the cutter with the axis of rotation of the wheel substantially parallel with the axis of the head and for selected movement in a plane substantially perpendicular with the axis of the head between a retracted inoperative position with the wheel to one side of the housing and the trimmer suspended above ground for trimming operations, and an extended operative position forwardly of the safety guard for rolling contact on the ground for supporting the cutter with said axis of the head in a substantially horizontal plane above the ground for edging.

2. The trimmer according to claim 1 wherein the safety guard has a lower side and an upper side, and wherein the mounting means locates the wheel at least partially above the safety guard while in the retracted inoperative position.

3. The trimmer according to claim 1 wherein the mounting means comprises means for moving the element in an arcuate path about said axis of the head.

4. In a line trimmer for cutting vegetation of the type having a housing, a head mounted to the housing for rotation about a motor axis, a flexible nonmetallic line extending outwardly from the head in a cutting plane, and a safety guard mounted to the housing and extending around a rearward portion of the housing, the improvement comprising:
    a bracket;
    a single wheel having an axis of rotation and rotatably mounted to one end of the bracket;
    mounting means for mounting the bracket to the safety guard with the wheel axis substantially parallel to the motor axis, and for moving the bracket and the wheel in a plane substantially perpendicular to the motor axis from a retracted inoperative position with the wheel located at one side of the motor housing for horizontal trimming operations with the trimmer suspended above ground, to an extended operative position with the wheel forward of the safety guard to engage the ground in rolling contact for supporting the cutter above the ground for edging operations.

5. The trimmer according to claim 4 wherein the bracket is slidably mounted to the safety guard.

6. The trimmer according to claim 4 wherein the mounting means allows the wheel to be moved substantially 90 degrees relative to the motor axis between the retracted inoperative position and the extended operative position.

7. The trimmer according to claim 4 wherein the safety guard has an upper side and a lower side, and wherein the wheel is located above the safety guard while in the retracted inoperative position.

8. In a line trimmer for cutting vegetation of the type having a housing, a handle extending from a rearward side of the housing at an acute angle, a head mounted to the housing for rotation about a motor axis, a flexible nonmetallic line extending outwardly from the head in a cutting plane substantially perpendicular to the motor axis, and a safety guard extending partially around the rearward portion of the housing, the safety guard including a plate substantially parallel with the cutting plane, having an upper side and a lower side and a depending flange, the improvement comprising:
    an arcuate flat bracket;
    a wheel rotatably mounted to one end of the bracket and protruding forwardly from the bracket; and
    means for mounting the bracket to the upper side of the safety guard for arcuate movement about the motor axis between a retracted inoperative position for trimming wherein the wheel and the bracket are at least partially located above the safety guard, to an extended operative position wherein the wheel and a portion of the bracket protrude forwardly of the housing, with the wheel located on the opposite side of the housing from the handle, for supporting the cutter above the ground with the motor axis substantially horizontal for edging operations.

9. The trimmer according to claim 8 wherein the bracket is concentric with the motor axis.

10. The trimmer according to claim 8 wherein the wheel has an axis that is substantially parallel with the motor axis, and wherein in the extended operative position, a plane containing the handle will pass through both axes.

11. The apparatus according to claim 8 wherein the bracket will slide substantially 90 degrees between the retracted inoperative position and the extended operative position.

* * * * *